United States Patent
Carlson et al.

[11] Patent Number: 5,805,864
[45] Date of Patent: Sep. 8, 1998

[54] VIRTUAL INTEGRATED CARTRIDGE LOADER FOR VIRTUAL TAPE STORAGE SYSTEM

[75] Inventors: Wayne Charles Carlson; James Arthur Fisher; Jonathan Wayne Peake, all of Tucson, Ariz.

[73] Assignee: International Business Machines Corporation, Armonk, N.Y.

[21] Appl. No.: 707,891

[22] Filed: Sep. 10, 1996

[51] Int. Cl.[6] .............................. G06F 12/06; G06F 12/08
[52] U.S. Cl. .......................... 395/500; 360/92; 360/132; 364/478.06; 369/30; 369/34; 395/821; 395/860; 395/888; 707/205; 711/4; 711/114; 711/118
[58] Field of Search ....................... 395/500, 82, 182.04, 395/821, 839, 860, 888; 360/92, 93, 132; 711/111, 4, 114, 118, 202, 209; 364/478.06, 478.03; 369/30, 34, 36, 47

[56] References Cited

U.S. PATENT DOCUMENTS

| | | | |
|---|---|---|---|
| 4,310,883 | 1/1982 | Clifton et al. | 707/205 |
| 4,945,429 | 7/1990 | Munro et al. | 360/92 |
| 5,128,815 | 7/1992 | Leonhardt et al. | 360/85 |
| 5,193,184 | 3/1993 | Belsan et al. | 711/4 |
| 5,202,809 | 4/1993 | Dodt et al. | 360/132 |
| 5,247,638 | 9/1993 | O'Brien et al. | 395/888 |
| 5,287,459 | 2/1994 | Gniewek | 369/34 |
| 5,386,516 | 1/1995 | Monahan et al. | 369/30 |
| 5,542,082 | 7/1996 | Solhjell | 711/115 |
| 5,694,600 | 12/1997 | Khenson et al. | 395/652 |

*Primary Examiner*—Kevin J. Teska
*Assistant Examiner*—Hani Mahmoud Kazimi
*Attorney, Agent, or Firm*—Baker Maxham Jester & Meador

[57] ABSTRACT

Virtual data storage cartridges are created on a data storage subsystem to/from which volume writes and reads are directed. When a number of data volumes have been written, the controller may migrate them to the tape drive, a much faster process than writing directly to tape and enabling multiple logical volumes to be written to a single physical tape. With the present invention, virtual scratch cartridges are virtually premounted in a virtual drive loader while the virtual drive is accessing another virtual cartridge. When the host calls for a new scratch cartridge, it can be mounted in the virtual drive almost immediately, having already been virtually pre-loaded.

56 Claims, 2 Drawing Sheets

VIRTUAL INTEGRATED CARTRIDGE LOADER FOR VIRTUAL TAPE STORAGE SYSTEM

BACKGROUND OF THE INVENTION

1. Field of the Invention

The present invention relates to digital data storage systems. More particularly, the invention concerns a system for storing data in a virtual tape system ("VTS"), including a virtual integrated cartridge loader for virtually pre-loading virtual tapes available for writing to reduce the scratch mount time.

2. Description of the Related Art

Speed is a critical aspect of digital data storage operations. Each facet of a read operation must execute as quickly as possible to ultimately provide a user with requested data. The same is true for write operations.

Data storage libraries use portable media items such as magnetic tape or optical cartridges. In such libraries, one time consuming part of a read/write operation typically involves the retrieval of the appropriate cartridge. In a read operation, retrieval of a desired cartridge involves removing the cartridge from one of many storage bins in the library and transferring the cartridge to a drive. Like read operations, write operations may also be directed to a specific cartridge. However, some write operations are performed simply to store data in any available cartridge. These operations are called "scratch mounts", since the write procedure may be completed by mounting and then writing to any blank or "scratch" cartridge of the library. Scratch mounts may be contrasted, for example, with write operations that serve to update or supplement data previously written to a cartridge.

A number of different approaches may be used to satisfy scratch mounts. One simple approach is for a human operator or robot to select a cartridge, manually transfer the cartridge to the drive, and then direct the drive to mount the cartridge. This approach, however, is time consuming and labor intensive.

Engineers have therefore recognized that scratch mounts can be more quickly satisfied by pre-locating one or more scratch cartridges physically near the drive. Some systems, for example, use an automated cartridge loader ("ACL"), an after-market component that attaches to a tape drive such as an IBM model 3480. The ACL holds a number of tape cartridges, and serially loads and unloads these cartridges into/from the drive. To more efficiently satisfy scratch mounts, an ACL may be pre-loaded with scratch mount cartridges for quick loading into its tape drive when needed.

Another type of automated cartridge loading device is the integrated cartridge loader ("ICL"). The ICL, like the ACL, also provides serial loading of cartridges to a tape drive. To efficiently satisfy scratch mounts, one or more scratch mount cartridges may be pre-loaded into the ICL. As a result, the pre-loaded scratch tapes are already nearby and easily accessible when needed. In contrast to the ACL, the ICL is integrated into a tape drive. An ICL may be provided, for example, in an IBM model 3490 tape drive. In addition to its serial feed mechanism, the ICL's drive may also receive cartridges from a mechanized robot.

Although useful for their intended applications, the known pre-loading techniques only concern physical data storage libraries Several companies have developed new "virtual cartridge libraries", which use virtual tape cartridges having no corresponding physical components. One example is described in U.S. Pat. No. 4,467,421, entitled "Virtual Storage System & Methods", issued Aug. 21, 1984. In systems such as these, the known pre-loading techniques are inapplicable.

SUMMARY OF THE INVENTION

Broadly, the present invention concerns a system for storing data in virtual data storage cartridges, providing a virtual integrated cartridge loader for virtually pre-loading virtual cartridges available for writing to reduce the scratch mount time. In one sense, the invention may be implemented to provide a process where virtual cartridges are created on a non-library data storage device ("DSD") to which volume write and read requests are directed. When a number of data volumes have been written, the controller may migrate them to a tape drive, a much faster process than writing directly to tape and enabling multiple logical volumes to be written to a single physical tape. With the present invention, virtual scratch cartridges are virtually premounted in a virtual drive loader while the virtual drive is accessing another virtual cartridge. When the host calls for a new scratch cartridge, it can be mounted in the virtual drive almost immediately, having already been virtually pre-loaded.

A different embodiment of the invention may be implemented to provide a virtual cartridge data storage apparatus, where one or more components of the apparatus are programmed to perform a method for managing a virtual cartridge library, including steps for virtually pre-loading virtual cartridges in the library to expedite scratch mount operations. Still another embodiment of the invention involves an article of manufacture, such as a data storage medium, tangibly embodying a program of machine-readable instructions executable by a digital processing apparatus to perform method steps for operating a virtual cartridge library system, where virtual cartridges are virtually pre-loaded to expedite scratch mounts.

The invention affords its users with a number of distinct advantages. For instance, the virtual integrated cartridge loader of the invention significantly reduces the time required for scratch mounts, since the next available virtual cartridge is pre-designated, thereby avoiding a possibly time consuming process of searching a next-cartridge database.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

HARDWARE COMPONENTS & INTERCONNECTIONS

Figure 1:
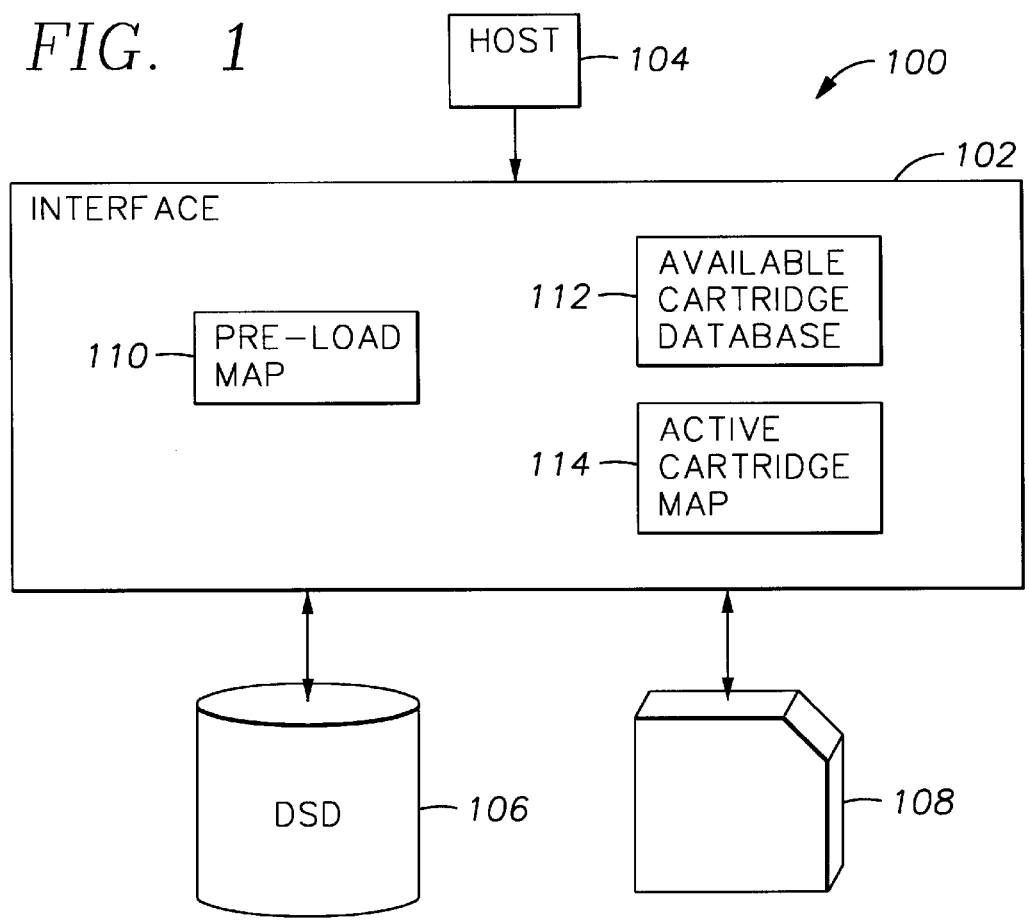
FIG. 1 is a diagram of the hardware components and interconnections of an illustrative implementation of the invention.

One aspect of the invention concerns a virtual cartridge data storage library capable of virtually pre-loading virtual cartridges, as discussed in greater detail below. FIG. 1 depicts the various hardware components and interconnections of one example of this system. More particularly, FIG. 1 depicts a data storage system 100 including an interface 102 interconnecting a host 104 and a DSD 106.

Cartridge Emulation System

The host 104 may be embodied by a number of diverse systems, such as a library controller, mainframe computer, personal computer, and the like. The host 104 issues commands in an appropriate format to direct the performance of read and/or write operations to interchangeable data storage media (not shown) called "cartridges" in a library (not shown) of such media. Such data cartridges may comprise, for instance, magnetic tape cartridges or optical cartridges.

However, neither the cartridges nor the library actually exist. In fact, the interface 102 serves to emulate a cartridge data storage library in communicating with the host, where the data is actually stored on the DSD 106. Therefore, the cartridges known to the host, since they do not actually exist in any physical embodiment, are called "virtual cartridges". Likewise, the cartridge storage library is called a "virtual library".

The DSD 106 may be implemented in a number of different forms, depending upon the particular requirements of the application. Preferably, the DSD 106 comprises a contiguous (non-library) storage device providing fast read/write access. For example, the DSD 106 may comprise one or more magnetic data storage disk drives, random access memory modules, optical data storage devices, or another suitable data storage device. Advantageously, the DSD 106 may be contiguous, non-library data storage unit, unlike the emulated multiplicity of cartridges.

The interface 102 preferably provides one or more virtual cartridge drives (not shown). Cartridge drives may represent, for example, magnetic tape drives, optical drives, or another drive for exchanging data with interchangeable data storage media. The interface 102 emulates the mounting and unmounting of the virtual drives, as well as reading and writing of data from/to the virtual cartridges mounted therein.

If desired, the system 100 may incorporate hardware components of existing virtual cartridge libraries, a number of which are well known in the art. One example is disclosed in U.S. Pat. No. 4,467,421, entitled "Virtual Storage System & Methods", issued Aug. 21, 1984. The '421 patent is incorporated by reference in its entirety. Further detail of the structure and operation of the interface 102 to emulate a cartridge data storage library in communicating with the host, while actually storing data on the DSD 106, should be apparent to those of ordinary skill in the art having the benefit of this disclosure and known virtual libraries such as the '421 patent.

Physical Backup Library

In contrast to the virtual library, the system 100 may include a "physical" backup library 108, where the term "physical" is used to contrast with a "virtual" library. The backup library 108 includes a multiplicity of data storage cartridges, such as tape and/or optical cartridges. Independent of the exchange of data between the host 104 and the DSD 106, the interface 102 uses the library 108 to occasionally migrate stale data from the DSD 106, freeing space on the DSD 106 to contain more frequently or recently used data. "Stale" data may be identified, for example, by a least recently used ("LRU") analysis.

Pre-loading Features

In contrast to known virtual cartridge libraries, the interface 102 of the system 100 includes a number of components that facilitate virtual pre-loading of virtual cartridges, the process of which is described in greater detail below. These components include an available cartridge database 112, which lists all virtual cartridges that are defined to the system 100 and available for data reading or writing to or from the host 104. In an illustrative application, the cartridge database 112 may contain thousands of virtual cartridges. Virtual cartridges may be listed in the database 112 by a number of different cartridge identifiers, such as a volume serial number ("volser"). As an example, these virtual cartridges may be blank, or alternatively filled with data amenable to being written over.

Another pre-load component of the interface 102 is the active cartridge map 114. The map 114 lists each virtual cartridge in the system 100 that has been virtually used to store an item of data. Thus, the map 114 cross-references each item of data stored on the DASD with one of the virtual cartridges. Preferably, the map 114 lists cartridges by their cartridge identifiers, e.g. volsers.

The interface 102 also includes a pre-load map 110, which lists a pool of virtual cartridges, selected from the list of available cartridges that can be used to write new data. Such virtual cartridges are preferably listed in the pre-load map 110 by their cartridge identifiers, e.g. volsers. When the host 104 next requests a scratch mount, the scratch mount is satisfied using the virtual drive and one of the virtual cartridges listed by the map 110. As discussed in greater detail below, this saves a significant amount of time otherwise spent searching the lengthy available cartridge database 112.

OPERATION

In addition to the various hardware embodiments described above, a different aspect of the invention concerns a method to virtually pre-load virtual cartridges in a virtual cartridge data storage library.

Program Storage

Such a method may be implemented, for example, by operating the interface 102 to execute a sequence of machine-readable instructions. These instructions reside in various types of data storage medium. In this respect, one aspect of the present invention concerns an article of manufacture, comprising a data storage medium tangibly embodying a program of machine-readable instructions executable by a digital data processor to perform method steps to virtually pre-loading virtual cartridges in a virtual cartridge library.

Figure 2:
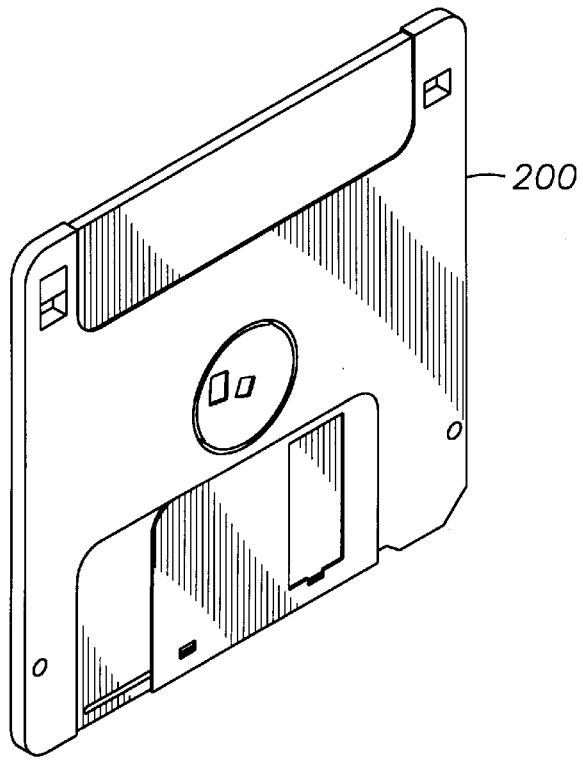
FIG. 2 is a diagram of an exemplary article of manufacture in accordance with the invention.

This data storage medium may comprise, for example, fast access memory (not shown) such as RAM contained within the interface 102. Alternatively, the instructions may be contained in another data storage medium, such as a magnetic data storage diskette 200 (FIG. 2). Whether contained in the diskette 200 or elsewhere, the instructions may instead be stored on another type of data storage medium such as DASD storage (e.g. a conventional "hard drive" or a RAID array), magnetic tape, electronic read-only memory (e.g. ROM), optical storage device (e.g. WORM), paper "punch" cards, or other data storage media. In an illustrative embodiment of the invention, the machine-readable instructions may comprise lines of compiled C language code.

Overall Method

Figure 3:
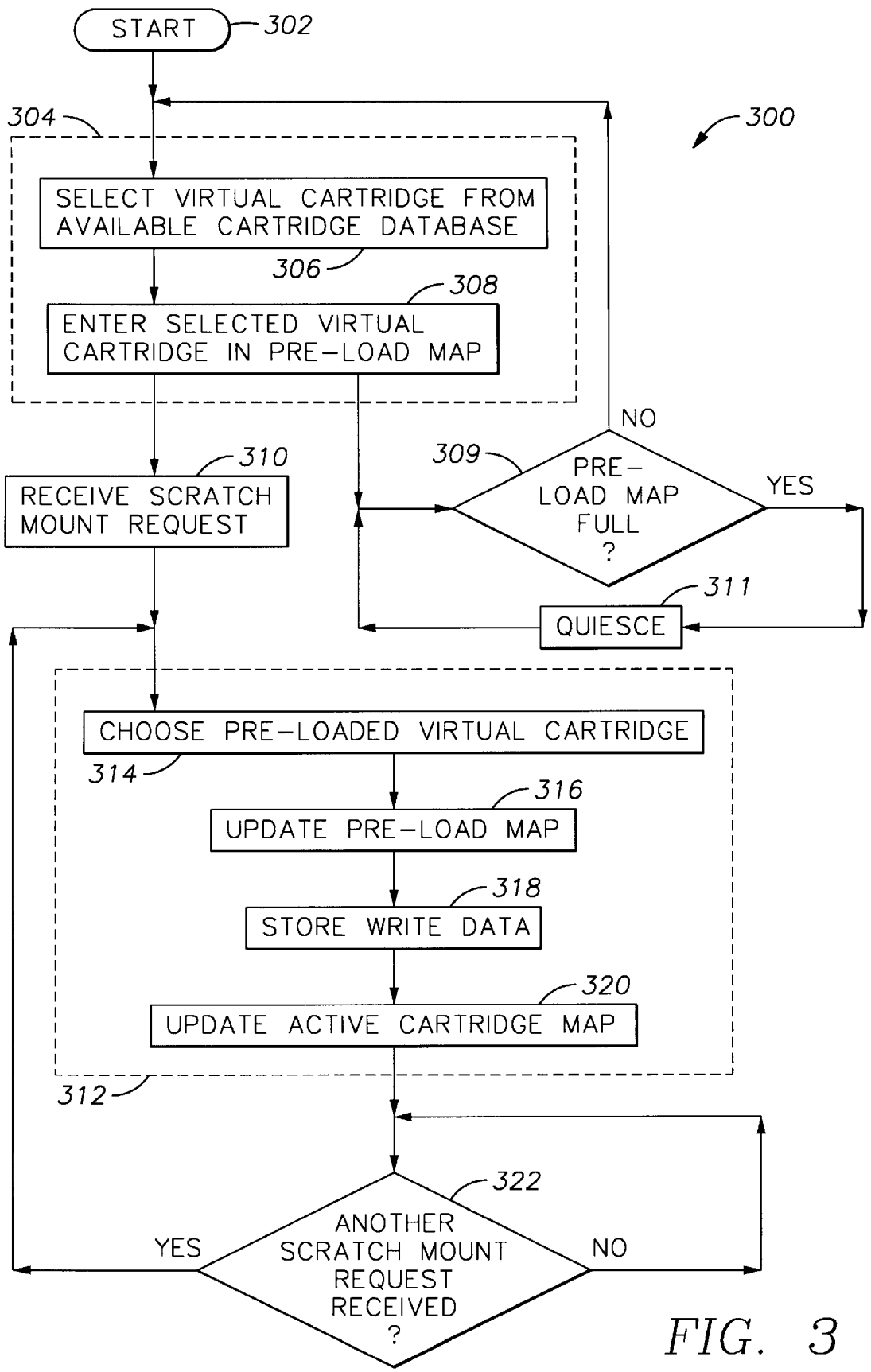
FIG. 3 is a flowchart showing a sequence of steps to manage a virtual cartridge data storage library in accordance with the invention.

FIG. 3 shows a sequence of method steps 300 to illustrate one example of the method aspect of the present invention. The process 300 comprises steps for virtually pre-loading virtual cartridges in a virtual cartridge library. For ease of explanation, but without any limitation intended thereby, the example of FIG. 3 is described in the context of the system 100 (FIG. 1) described above.

Establishing Pre-Load Map

After the steps are initiated in task 302, task 304 designates a number of virtual cartridges for virtual pre-loading, in effect initializing the pre-load map 110. More specifically, task 306 selects one or more virtual cartridges listed in the available cartridge database 112 to be used for writing new data. As discussed in greater detail below, these virtual cartridges are being selected for the pre-load map 110, ultimately making the virtual cartridges available for virtual pre-loading in accordance with the invention.

Single Data Format Cartridge Selection

If all virtual cartridges are given the virtual same data storage characteristics, task 306 may involve a simple process of selecting the first one or more virtual cartridges in the database 112.

Multiple Data Format Cartridge Selection

The invention may advantageously be implemented to facilitate virtual cartridges of multiple different data formats. Using tape cartridges as an example, these data formats may include IBM Cartridge System Tape ("CST"), Enhanced Capacity Cartridge System Tape ("ECCST"), and Magstar Tape. The CST uses 18-track or 36-track technology, ECCST uses 36 tracks, and Magstar Tape uses 128 tracks. The invention may even implement virtual cartridges of completely different storage formats, such as optical media, floppy disks, or any other data storage media.

In one embodiment, the formats of the virtual cartridges are specified by host commands that specifically assign a data format to each virtual cartridge. If the system 100 facilitates virtual cartridges of multiple data formats, then task 306 involves selecting one or more virtual cartridges of each data format from the available cartridge database. Task 306 may also update the available cartridge database 112 to designate the selected virtual cartridge as being "in use", so that the selected virtual cartridge is not incorrectly selected again.

The virtual drive(s) of the interface 102 may also be associated with specific data formats, wherein certain virtual cartridges are compatible with certain types of drives.

Pre-loading

After task 306, task 308 enters the selected virtual cartridges in the pre-load map 110. If the interface 102 provides multiple data storage formats, the pre-load map 110 preferably includes multiple sub-maps (not shown), each sub-map corresponding to a different data storage format. Accordingly, task 308 copies the selected virtual cartridges into the appropriate sub-maps of the pre-load map 110.

After task 308, advances to task 310, as discussed below. Concurrently, control is also routed to query 309, which asks whether the pre-load map 110 is full. If so, task 311 quiesces for a predetermined period of time before repeating query 309. When query 309 finds that the pre-load map 110 is no longer full due to one or more vacancies, task 304 begins again to select further virtual cartridges from the available cartridge database. Accordingly, steps 309, 311, and 304 see that virtual cartridges are constantly being pre-loaded as needed. As a result, when scratch mount requests arrive from the host 104 (as discussed below), these requests can be expeditiously satisfied. Advantageously, repetition of task 304 may be performed in the background with regard to subsequent tasks 310–312, to minimize interference with pre-loading and to beneficially use otherwise idle times.

Receiving Mount Request

After task 308, the interface 102 in task 310 receives a scratch mount request from the host 104. As explained above, the scratch mount request comprises a request from the host to write data to a cartridge that, unknown to the host 104, is actually a virtual cartridge managed by the interface 102.

The host request includes a command requesting a scratch mount of a cartridge. In a system that provides virtual cartridges of multiple data formats, the host request may also specify a desired data format.

Satisfying Mount Request and Performing Write Operation

After the interface 102 receives the scratch mount request in task 310, the interface satisfies the request and completes the write operation in task 312. First, in task 314, the interface 102 chooses a virtual cartridge from the pre-load map 110 to satisfy the scratch mount request. If the system 100 facilitates multiple data storage formats, the virtual cartridge is chosen from the appropriate sub-map of the pre-load map 110. After task 314, the interface 102 in task 316 updates the pre-load map 110 by removing the virtual cartridge used to satisfy the mount request.

At this point, the scratch mount request itself has been satisfied: a pre-loaded virtual cartridge has been chosen and removed from the pre-load map 110. Optionally, the interface 102 may continue by receiving and storing write data (task 318) and updating the active cartridge map accordingly (task 320). More particularly, the write data is first received from the host 104 or another source accessible by the interface 102, and then stored on the DSD 106 (task 318). Next, the interface 102 in task 320 updates the active cartridge map 114 to cross-reference the write data (stored on the DSD 106) with the virtual cartridge that was selected from the pre-load map 110 in task 314. After task 320, the active cartridge map 114 indicates that the selected virtual cartridge (virtually) contains the received write data. Alternatively, the active cartridge map 114 may simply indicate that the virtual cartridge chosen in task 314 was used to satisfy the scratch mount request.

If the interface 102 provides multiple virtual drives, the foregoing steps 314–320 may be performed concurrently for each virtual drive or repeated for each virtual drive. For each virtual drive, this involves separately choosing a pre-loaded virtual cartridge from the appropriate sub-map, updating the pre-load map 110, storing write data, and updating the active cartridge map 114.

After task 320, query 322 asks whether another scratch mount request has been received from the host 102. If so, query 322 begins task 312 anew.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

As one alternative to the illustrated sequence 300, the tasks 318 and 320 may be performed at a later time. In particular, the scratch mount request may be satisfied in task 312 by choosing a pre-loaded virtual cartridge and updating the active cartridge map (tasks 314, 316), where the receipt/storage of write data (task 318) and updating of the active cartridge map (task 320) are performed later, separately from the routine 300.

What is claimed is:

1. In a data storage system that provides an interface between a host and a data storage device ("DSD"), said interface emulating a virtual cartridge data storage library in communicating with the host, said virtual cartridge data storage library including a plurality of virtual cartridges, a method for virtually pre-loading virtual cartridges comprising the steps of:

maintaining an available cartridge database containing a list of virtual cartridges, each virtual cartridge identified in the available cartridge database by a virtual cartridge identifier;

maintaining an active cartridge map cross-referencing each item of data stored on the DSD with one of the virtual cartridges;

selecting a virtual cartridge identifier from the available database;

entering the selected virtual cartridge identifier in a pre-load map;

receiving from a host a scratch mount request; and satisfying the scratch mount request by performing steps comprising:

choosing one of the cartridge identifiers from the pre-load map; and removing the chosen virtual cartridge identifier from the pre-load map.

2. The method of claim 1, further comprising the steps of:

receiving from the host write data corresponding to the scratch mount request;

storing the write data in the DSD; and updating the active cartridge map to cross-reference the write data with the chosen virtual cartridge.

3. The method of claim 1, the virtual cartridges representing magnetic tape cartridges.

4. The method of claim 1, the virtual cartridges representing optical media cartridges.

5. The method of claim 1, the step of selecting a virtual cartridge identifier from the available database comprising the steps of:

designating one of the virtual cartridges in the available cartridge database as being next; and selecting the next virtual cartridge.

6. The method of claim 1, the DSD comprising at least one magnetic data storage drive.

7. In a data storage system that provides an interface between a host and a cache, said interface emulating a virtual cartridge data storage library in communicating with the host, said virtual cartridge data storage library including a plurality of virtual cartridges, a method for virtually pre-loading virtual cartridges comprising the steps of:

maintaining an available cartridge database containing a list of virtual cartridges, each virtual cartridge identified in the available cartridge database by a virtual cartridge identifier;

maintaining an active cartridge map cross-referencing each item of data stored on the cache with one of the virtual cartridges;

selecting a virtual cartridge identifier from the available database;

entering the selected virtual cartridge identifier in a pre-load map;

receiving from a host a scratch mount request; and satisfying the scratch mount request by performing steps comprising:

choosing one of the cartridge identifiers from the pre-load map; and removing the chosen virtual cartridge identifier from the pre-load map.

8. The method of claim 7, further comprising the steps of:

receiving from the host write data corresponding to the scratch mount request;

storing the write data in the cache; and updating the active cartridge map to cross-reference the write data with the chosen virtual cartridge.

9. The method of claim 7, the cache comprising a magnetic disk storage drive.

10. The method of claim 7, the cache comprising at least one solid state memory device.

11. In a data storage system that provides an interface between a host and a data storage device ("DSD"), said interface emulating a virtual cartridge data storage library in communicating with the host, said virtual cartridge data storage library including a plurality of virtual cartridges, said virtual cartridges having multiple different data formats, a method for virtually pre-loading virtual cartridges comprising the steps of:

maintaining an available cartridge database containing a list of virtual cartridges, each virtual cartridge identified in the available cartridge database by a virtual cartridge identifier;

maintaining an active cartridge map cross-referencing each item of data stored on the DSD with one of the virtual cartridges;

for each data format, selecting a virtual cartridge identifier of the corresponding data format from the available database and entering the selected virtual cartridge identifier in a pre-load map;

receiving from a host a scratch mount request for a virtual cartridge of a specified data format; and satisfying the scratch mount request by performing steps comprising:

choosing from the pre-load map one of the cartridge identifiers having the specified data format; and removing the chosen virtual cartridge identifier from the pre-load map.

12. The method of claim 11, further comprising the steps of:

receiving from the host write data corresponding to the scratch mount request;

storing the write data in the DSD; and updating the active cartridge map to cross-reference the write data with the chosen virtual cartridge.

13. The method of claim 11, each data format representing a different data storage capacity.

14. The method of claim 11, each data format representing a different number of parallel data tracks provided by virtual cartridges having that data format.

15. The method of claim 1, each data format representing a different data storage pattern provided by virtual cartridges having that data format.

16. The method of claim 11, the DSD comprising at least one magnetic data storage drive.

17. In a data storage system that provides an interface between a host and a data storage device ("DSD"), said interface emulating a virtual cartridge data storage library in communicating with the host, said virtual cartridge data storage library including a plurality of virtual cartridges, said library also including multiple virtual drives, a method for virtually pre-loading virtual cartridges comprising the steps of:

maintaining an available cartridge database containing a list of virtual cartridges, each virtual cartridge identified in the available cartridge database by a virtual cartridge identifier;

maintaining an active cartridge map cross-referencing each item of data stored on the DSD with one of the virtual cartridges;

for each virtual drive, performing steps comprising:

selecting a virtual cartridge identifier from the available database;

entering the selected virtual cartridge identifier in a pre-load map associated with that drive;

receiving from a host a scratch mount request and selection of one of the virtual drives to satisfy the mount request; and satisfying the scratch mount request by performing steps comprising:

choosing one of the cartridge identifiers from the pre-load map associated with the selected virtual drive; and removing the chosen virtual cartridge identifier from the pre-load map associated with the selected virtual drive.

18. The method of claim 17, further comprising the steps of:

receiving from the host write data corresponding to the scratch mount request;

storing the write data in the DSD; and updating the active cartridge map to cross-reference the write data with the chosen virtual cartridge.

19. The method of claim 17, the DSD comprising at least one magnetic data storage drive.

20. An article of manufacture comprising a data storage medium tangibly embodying a program of machine-readable instructions executable by a digital processing apparatus to perform method steps for virtually pre-loading virtual cartridges in a data storage system that provides an interface between a host and a data storage device ("DSD"), said interface emulating a virtual cartridge data storage library in communicating with the host, said virtual cartridge data storage library including a plurality of virtual cartridges, said method steps comprising:

maintaining an available cartridge database containing a list of virtual cartridges, each virtual cartridge identified in the available cartridge database by a virtual cartridge identifier;

maintaining an active cartridge map cross-referencing each item of data stored on the DSD with one of the virtual cartridges;

selecting a virtual cartridge identifier from the available database;

entering the selected virtual cartridge identifier in a pre-load map;

receiving from a host a scratch mount request; and satisfying the scratch mount request by performing steps comprising:

choosing one of the cartridge identifiers from the pre-load map; and removing the chosen virtual cartridge identifier from the pre-load map.

21. The article of manufacture of claim 20, the method steps further comprising:

receiving from the host write data corresponding to the scratch mount request;

storing the write data in the DSD; and updating the active cartridge map to cross-reference the write data with the chosen virtual cartridge.

22. The article of manufacture of claim 20, the virtual cartridges representing magnetic tape cartridges.

23. The article of manufacture of claim 20, the virtual cartridges representing optical media cartridges.

24. The article of manufacture of claim 20, the step of selecting a virtual cartridge identifier from the available database comprising the steps of:

designating one of the virtual cartridges in the available cartridge database as being next; and selecting the next virtual cartridge.

25. An article of manufacture comprising a data storage medium tangibly embodying a program of machine-readable instructions executable by a digital processing apparatus to perform method steps for virtually pre-loading virtual cartridges in a data storage system that provides an interface between a host and a cache, said interface emulating a virtual cartridge data storage library in communicating with the host, said virtual cartridge data storage library including a plurality of virtual cartridges, said method steps comprising:

maintaining an available cartridge database containing a list of virtual cartridges, each virtual cartridge identified in the available cartridge database by a virtual cartridge identifier;

maintaining an active cartridge map cross-referencing each item of data stored on the cache with one of the virtual cartridges;

selecting a virtual cartridge identifier from the available database;

entering the selected virtual cartridge identifier in a pre-load map;

receiving from a host a scratch mount request; and satisfying the scratch mount request by performing steps comprising:

choosing one of the cartridge identifiers from the pre-load map; and removing the chosen virtual cartridge identifier from the pre-load map.

26. The article of manufacture of claim 25, the method steps further comprising:

receiving from the host write data corresponding to the scratch mount request;

storing the write data in the cache; and updating the active cartridge map to cross-reference the write data with the chosen virtual cartridge.

27. The article of manufacture of claim 25, the cache comprising a magnetic disk storage drive.

28. The article of manufacture of claim 25, the cache comprising at least one solid state memory device.

29. An article of manufacture comprising a data storage medium tangibly embodying a program of machine-readable instructions executable by a digital processing apparatus to perform method steps for virtually pre-loading virtual cartridges in a data storage system that provides an interface between a host and a data storage device ("DSD"), said interface emulating a virtual cartridge data storage library in communicating with the host, said virtual cartridge data storage library including a plurality of virtual cartridges, said virtual cartridges having multiple different data formats, said method steps comprising:

maintaining an available cartridge database containing a list of virtual cartridges, each virtual cartridge identified in the available cartridge database by a virtual cartridge identifier;

maintaining an active cartridge map cross-referencing each item of data stored on the DSD with one of the virtual cartridges;

for each data format, selecting a virtual cartridge identifier of the corresponding data format from the available database and entering the selected virtual cartridge identifier in a pre-load map;

receiving from a host a scratch mount request for a virtual cartridge of a specified data format; and satisfying the scratch mount request by performing steps comprising:
  choosing from the pre-load map one of the cartridge identifiers having the specified data format; and
  removing the chosen virtual cartridge identifier from the pre-load map.

30. The article of manufacture of claim 29, each data format representing a different data storage capacity.

31. The article of manufacture of claim 29, the method steps further comprising:
  receiving from the host write data corresponding to the scratch mount request;
  storing the write data in the DSD; and
  updating the active cartridge map to cross-reference the write data with the chosen virtual cartridge.

32. The article of manufacture of claim 29, each data format representing a different number of parallel data tracks provided by virtual cartridges having that data format.

33. The article of manufacture of claim 29, each data format representing a different data storage pattern provided by virtual cartridges having that data format.

34. An article of manufacture comprising a data storage medium tangibly embodying a program of machine-readable instructions executable by a digital processing apparatus to perform method steps for virtually pre-loading virtual cartridges in a data storage system that provides an interface between a host and a data storage device ("DSD"), said interface emulating a virtual cartridge data storage library in communicating with the host, said virtual cartridge data storage library including a plurality of virtual cartridges, said library also including multiple virtual drives, said method steps comprising:
  maintaining an available cartridge database containing a list of virtual cartridges, each virtual cartridge identified in the available cartridge database by a virtual cartridge identifier;
  maintaining an active cartridge map cross-referencing each item of data stored on the DSD with one of the virtual cartridges;
  for each virtual drive, performing steps comprising:
    selecting a virtual cartridge identifier from the available database;
    entering the selected virtual cartridge identifier in a pre-load map associated with that drive;
  receiving from a host a scratch mount request and selection of one of the virtual drives to satisfy the mount request; and
  satisfying the scratch mount request by performing steps comprising:
    choosing one of the cartridge identifiers from the pre-load map associated with the selected virtual drive; and
    removing the chosen virtual cartridge identifier from the pre-load map associated with the selected virtual drive.

35. The article of manufacture of claim 34, the method steps further comprising:
  receiving from the host write data corresponding to the scratch mount request;
  storing the write data in the DSD; and
  updating the active cartridge map to cross-reference the write data with the chosen virtual cartridge.

36. A virtual cartridge data storage system, comprising:
  a data storage device ("DSD");
  an interface interposed between the DSD and a host, said interface emulating a virtual cartridge data storage library in communicating with the host, said virtual cartridge data storage library including a plurality of virtual cartridges, said interface being programmed to virtually pre-load virtual cartridges by performing steps comprising:
    maintaining an available cartridge database containing a list of virtual cartridges, each virtual cartridge identified in the available cartridge database by a virtual cartridge identifier;
    maintaining an active cartridge map cross-referencing each item of data stored on the DSD with one of the virtual cartridges;
    selecting a virtual cartridge identifier from the available database;
    entering the selected virtual cartridge identifier in a pre-load map;
    receiving from a host a scratch mount request; and
    satisfying the scratch mount request by performing steps comprising:
      choosing one of the cartridge identifiers from the pre-load map; and
      removing the chosen virtual cartridge identifier from the pre-load map.

37. The virtual cartridge data storage system of claim 36, the interface being further programmed to perform steps comprising:
  receiving from the host write data corresponding to the scratch mount request;
  storing the write data in the DSD; and
  updating the active cartridge map to cross-reference the write data with the chosen virtual cartridge.

38. The apparatus of claim 36, further comprising a physical tape storage library coupled to the interface.

39. The apparatus of claim 36, the virtual cartridges representing magnetic tape cartridges.

40. The apparatus of claim 36, the virtual cartridges representing optical media cartridges.

41. The apparatus of claim 36, the step of selecting a virtual cartridge identifier from the available database comprising the steps of:
  designating one of the virtual cartridges in the available cartridge database as being next; and
  selecting the next virtual cartridge.

42. The apparatus of claim 36, the DSD comprising at least one magnetic data storage device.

43. The apparatus of claim 36, the DSD comprising random access memory.

44. A virtual cartridge data storage system, comprising:
  a cache memory;
  an interface interconnected between the cache and a host, said interface emulating a virtual cartridge data storage library in communicating with the host, said virtual cartridge data storage library including a plurality of virtual cartridges, said interface being programmed to virtually pre-load virtual cartridges by performing steps comprising:
    maintaining an available cartridge database containing a list of virtual cartridges, each virtual cartridge identified in the available cartridge database by a virtual cartridge identifier;
    maintaining an active cartridge map cross-referencing each item of data stored on the cache with one of the virtual cartridges;
    selecting a virtual cartridge identifier from the available database;
    entering the selected virtual cartridge identifier in a pre-load map;

receiving from a host a scratch mount request; and satisfying the scratch mount request by performing steps comprising:

choosing one of the cartridge identifiers from the pre-load map; and removing the chosen virtual cartridge identifier from the pre-load map.

45. The virtual cartridge data storage system of claim 44, the interface being further programmed to perform steps comprising:

receiving from the host write data corresponding to the scratch mount request;

storing the write data in the cache; and updating the active cartridge map to cross-reference the write data with the chosen virtual cartridge.

46. The apparatus of claim 44, the cache comprising a magnetic disk storage drive.

47. The apparatus of claim 44, the cache comprising at least one solid state memory device.

48. A virtual cartridge data storage system, comprising:

a data storage device ("DSD");

an interface providing an interface between the DSD and a host, said interface emulating a virtual cartridge data storage library in communicating with the host, said virtual cartridge data storage library including a plurality of virtual cartridges, said virtual cartridges having multiple different data formats, said interface being programmed to virtually pre-load virtual cartridges by performing steps comprising:

maintaining an available cartridge database containing a list of virtual cartridges, each virtual cartridge identified in the available cartridge database by a virtual cartridge identifier;

maintaining an active cartridge map cross-referencing each item of data stored on the DSD with one of the virtual cartridges;

for each data format, selecting a virtual cartridge identifier of the corresponding data format from the available database and entering the selected virtual cartridge identifier in a pre-load map;

receiving from a host a scratch mount request for a virtual cartridge of a specified data format; and satisfying the scratch mount request by performing steps comprising:

choosing from the pre-load map one of the cartridge identifiers having the specified data format; and removing the chosen virtual cartridge identifier from the pre-load map.

49. The virtual cartridge data storage system of claim 48, the interface being further programmed to perform steps comprising:

receiving from the host write data corresponding to the scratch mount request;

storing the write data in the DSD; and updating the active cartridge map to cross-reference the write data with the chosen virtual cartridge.

50. The apparatus of claim 48, each data format representing a different data storage capacity.

51. The apparatus of claim 48, each data format representing a different number of parallel data tracks provided by virtual cartridges having that data format.

52. The apparatus of claim 48, each data format representing a different data storage pattern provided by virtual cartridges having that data format.

53. The apparatus of claim 48, the DSD comprising at least one magnetic data storage device.

54. The apparatus of claim 48, the DSD comprising random access memory.

55. A virtual cartridge data storage system, comprising:

a data storage device ("DSD");

an interface coupled between a host and the DSD, said interface emulating a virtual cartridge data storage library in communicating with the host, said virtual cartridge data storage library including a plurality of virtual cartridges, said library also including multiple virtual drives, a method for virtually pre-loading virtual cartridges comprising the steps of:

maintaining an available cartridge database containing a list of virtual cartridges, each virtual cartridge identified in the available cartridge database by a virtual cartridge identifier;

maintaining an active cartridge map cross-referencing each item of data stored on the DSD with one of the virtual cartridges;

for each virtual drive, performing steps comprising:

selecting a virtual cartridge identifier from the available database;

entering the selected virtual cartridge identifier in a pre-load map associated with that drive;

receiving from a host a scratch mount request and selection of one of the virtual drives to satisfy the mount request; and satisfying the scratch mount request by performing steps comprising:

choosing one of the cartridge identifiers from the pre-load map associated with the selected virtual drive; and removing the chosen virtual cartridge identifier from the pre-load map associated with the selected virtual drive.

56. The virtual cartridge data storage system of claim 55, the interface being further programmed to perform steps comprising:

receiving from the host write data corresponding to the scratch mount request;

storing the write data in the DSD; and updating the active cartridge map to cross-reference the write data with the chosen virtual cartridge.

* * * * *

UNITED STATES PATENT AND TRADEMARK OFFICE
CERTIFICATE OF CORRECTION

PATENT NO. : 5,805,864
DATED : September 8, 1998
INVENTOR(S) : Carlson et al

It is certified that error appears in the above-identified patent and that said Letters Patent is hereby corrected as shown below:

On the title page,
item [56] references cited, insert:

| | | | |
|---|---|---|---|
| 4,467,421 | 08/1984 | White | 364/200 |
| 5,164,909 | 11/1992 | Leonhardt et al | 364/478 |
| 5,291,001 | 03/1994 | Krayer et al | 235/375 |
| 5,345,350 | 09/1994 | Ellis et al | 360/92 |
| 5,416,914 | 05/1995 | Korngiebel et al | 395/425 |
| 5,438,674 | 08/1995 | Keele et al | 395/404 |
| 5,455,926 | 10/1995 | Keele et al | 395/404 |

"Exploitation of Mount Caching for an Automated Tape Library", Aden et al., IBM Technical Disclosure Bulletin, Vol. 35, No. 3, August 1992, pp. 432-433

"Logical Grouping of Data Storage Media in a Library System", Goncharsky et al., IBM Technical Bulletin, Vol. 35, No. 5 October 1992, pp. 17-20.

Signed and Sealed this

Fifth Day of January, 1999

Attest:

Attesting Officer

*Acting Commissioner of Patents and Trademarks*